United States Patent
Ding et al.

(10) Patent No.: US 11,269,881 B2
(45) Date of Patent: Mar. 8, 2022

(54) DATA QUERY

(71) Applicant: New H3C Big Data Technologies Co., Ltd., Zhengzhou (CN)

(72) Inventors: Yuanpu Ding, Beijing (CN); Riguang Li, Beijing (CN)

(73) Assignee: NEW H3C BIG DATA TECHNOLOGIES CO., LTD., Zhengzhou (CN)

( * ) Notice: Subject to any disclaimer, the term of this patent is extended or adjusted under 35 U.S.C. 154(b) by 14 days.

(21) Appl. No.: 16/766,231

(22) PCT Filed: Nov. 29, 2018

(86) PCT No.: PCT/CN2018/118249
§ 371 (c)(1),
(2) Date: May 21, 2020

(87) PCT Pub. No.: WO2019/105420
PCT Pub. Date: Jun. 6, 2019

(65) Prior Publication Data
US 2020/0372028 A1 Nov. 26, 2020

(30) Foreign Application Priority Data
Nov. 30, 2017 (CN) .......................... 201711235855.2

(51) Int. Cl.
*G06F 16/2453* (2019.01)
*G06F 16/242* (2019.01)
(Continued)

(52) U.S. Cl.
CPC .... *G06F 16/24542* (2019.01); *G06F 16/2282* (2019.01); *G06F 16/242* (2019.01); *G06F 16/2452* (2019.01)

(58) Field of Classification Search
CPC ............. G06F 16/24542; G06F 16/242; G06F 16/2452; G06F 16/2282; G06F 16/2228
See application file for complete search history.

(56) References Cited

U.S. PATENT DOCUMENTS 8,489,773 B1 * 7/2013 Binshtock ........... H04L 67/1095
709/248
9,779,150 B1 10/2017 Sherman et al.
(Continued)

FOREIGN PATENT DOCUMENTS

| CN | 101350028 | 1/2009 |
| CN | 101788992 | 7/2010 |

(Continued)

OTHER PUBLICATIONS

Ankam, Big Data Analytics, Data Sources Api, pp. 1-9, Sep. 2016.*
(Continued)

*Primary Examiner* — Albert M Phillips, III
(74) *Attorney, Agent, or Firm* — Norton Rose Fulbright US LLP

(57) ABSTRACT

A querier sends a SparkSQL query instruction to a connector, the SparkSQL query instruction contains a table identifier of an HBase table, metadata of the HBase table, and an attribute value corresponding to the metadata. When the connector receives the SparkSQL query instruction, if an index table corresponding to the table identifier and the metadata exists in a storage device, the connector generates a first Phoenix query instruction and sends the first Phoenix query instruction to the storage device, the index table is used to record a correspondence between an attribute value of the metadata of the HBase table and a RowKey of the HBase table, and the first Phoenix query instruction contains the table identifier, the metadata, and the attribute value. When receiving the first Phoenix query instruction, the (Continued)

storage device obtains the RowKey and the metadata, obtains the data row, and sends the data row to the connector.

20 Claims, 4 Drawing Sheets

(51) Int. Cl.
   *G06F 16/2452* (2019.01)
   *G06F 16/22* (2019.01)

(56) References Cited

U.S. PATENT DOCUMENTS

| | | | | |
|---|---|---|---|---|
| 2016/0104090 | A1* | 4/2016 | Alekseyev | G06Q 10/06393 |
| | | | | 705/7.39 |
| 2017/0139997 | A1 | 5/2017 | Arasan et al. | |

FOREIGN PATENT DOCUMENTS

| | | |
|---|---|---|
| CN | 102737132 | 10/2012 |
| CN | 103930887 | 7/2014 |
| CN | 104750727 | 7/2015 |
| CN | 105354255 | 2/2016 |
| CN | 105589969 | 5/2016 |
| CN | 106682042 | 5/2017 |
| CN | 107122437 | 9/2017 |
| CN | 107133342 | 9/2017 |
| JP | 2010224824 | 10/2010 |
| JP | 2015072688 | 4/2015 |

OTHER PUBLICATIONS

Aven, Sams Teach Yourself Apache Spark in 24 hours, pp. 1-16, Aug. 2016.*

Merriam Webster Dictionary, 2011, definition of "when", 1 page, (Year: 2011).*

Office Action issued in Corresponding Japanese Application No. 2020-544099, dated Jun. 8, 2021 (English Translation provided).

International Search Report and Written Opinion issued in corresponding PCT application PCT/CN2018/118249, dated Feb. 27, 2019 (English Translation Provided).

"Apache Spark Plugin." *Apache Phoenix*, https://web.archive.org/web/20171108213644/http://phoenix.apache.org/phoenix_spark.html. Retrieved Jun. 22, 2020. 6 pages.

"Grammar." *Apache Phoenix*, https://web.archive.org/web/20171117154909/http://phoenix.apache.org/language/index.html. Retrieved Jun. 22, 2020. 20 pages.

"Overview." *Apache Phoenix*, https://web.archive.org/web/20171120182113/http://phoenix.apache.org/. Retrieved Jun. 22, 2020. 4 pages.

"Secondary Indexing." *Apache Phoenix*, https:web.archive.org/web/20171107060229/http://phoenix.apache.org/secondary_indexing.html. Retrieved Jun. 22, 2020. 10 pages.

"Tuning Guide." *Apache Phoenix*, https://web.archive.org/web/20171119145022/https://phoenix.apache.org/tuning_guide.html. Retrieved Jun. 22, 2020. 7 pages.

Extended European Search Report issued in Corresponding European Application No. 18884738.8, dated Jul. 1, 2020.

* cited by examiner

DATA QUERY

CROSS REFERENCE TO RELATED APPLICATION APPLICATIONS

The present application is a national phase application under 35 U.S.C. § 371 of International Application No. PCT/CN2018/118249, filed Nov. 29, 2018, which claims the benefit of priority to Chinese Patent Application No. 201711235855.2, filed on Nov. 30, 2017, the entire contents of each of which are incorporated herein by reference in their entirety.

BACKGROUND

HBase is a highly reliable, high-performance, column-oriented, scalable distributed storage system that provides random, real-time read and write access to large data sets. The HBase database stores data in the form of a data table (herein referred to as HBase table) which may comprise rows and column families, as shown in Table 1 which is an example of an HBase table. RowKey is an index. A column family may comprise one or more columns. The Name, Address, Age, Phone Number, Mailbox, etc. in Table 1 are metadata, each of which corresponds to multiple attribute values. For example, the attribute values corresponding to Name include San Zhang and Si Li.

TABLE 1

|        | Column family A |          |     | Column family B |         |
|--------|-----------------|----------|-----|-----------------|---------|
| RowKey | Name            | Address  | Age | Phone Number    | Mailbox |
| 001    | San Zhang       | Beijing  | 28  | 18611111111     | . . .   |
| 002    | Si Li           | Shanghai | 33  | 18622222222     | . . .   |
| 003    | Wu Wang         | Hangzhou | 40  | 18633333333     | . . .   |
| 004    | Liu Zhao        | Guangzhou| 43  | 18644444444     | . . .   |

DETAILED DESCRIPTION

Based on the HBase table structure shown in Table 1, the data can be quickly retrieved according to the RowKey. For example, when a query request is received, if the query request includes a RowKey 001, the content queried from the HBase table is the data of the first row, and thus, the data of the first row is sent back. If the query request does not contain a RowKey, but includes the attribute value of a certain metadata, such as Beijing, the corresponding data cannot be quickly retrieved based on the RowKey, in which case the entire HBase table is scanned to query the row of data including the attribute value "Beijing", which results in very low query performance.

Figure 1:
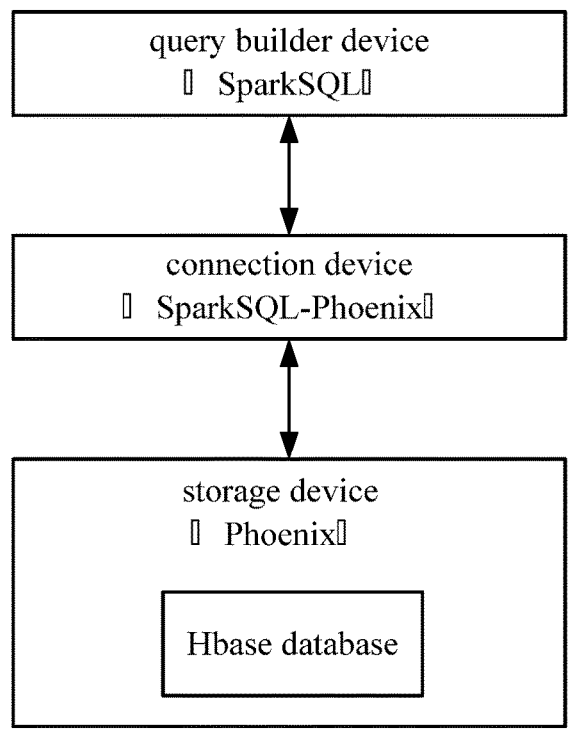
FIG. 1 is a structural diagram of a data query system in one example of the present disclosure.

In view of the above, the present disclosure propose a method of data query that is applicable to a data query system comprising a storage device, a querier, and a connector. The querier, the storage device, and the connector may be deployed on the same server or on different servers. If the querier, the storage device, and the connector are deployed on the same server, the querier, the storage device, and the connector are three functional modules of the server, for example, the querier being a SQL (Structured Query Language) engine that is capable of realizing data query functions, the storage device being a database that is capable of realizing data storage functions, and the connector being a middleware that is capable of realizing connection functions. If the querier, the storage device, and the connector are deployed on different servers, the querier, the storage device, and the connector are three separate servers. FIG. 1 is a structural diagram of the above data query system.

When the HBase database is used to store data, the storage device may use a Phoenix component to realize data storage. The Phoenix component is used to provide SQL support for the HBase database, so that when receiving a SQL request, the storage device performs operation on the data in the HBase database according to the SQL request.

The querier may use a SparkSQL engine (a Spark-based distributed SQL engine) to realize data query. The SparkSQL engine may open multiple interfaces for accessing external data sources (DataSource), such as JDBC (Java DataBase Connectivity), ODBC (Open Database Connectivity), and API (Application Programming Interface), etc. The SparkSQL engine may also support data sources in various formats, such as JSON (Java Script Object Notation), Parquet (column storage format), avro (data serialization system), CSV (Comma Separated Values), and so on.

The storage device using the Phoenix component to store data and the querier using the SparkSQL engine to query data means that the querier is capable of processing a SparkSQL instruction, and the storage device is capable of processing a Phoenix instruction. Therefore, when the querier sends a SparkSQL instruction, the storage device will not be able to process the SparkSQL instruction if it receives the SparkSQL instruction. Similarly, when the storage device sends a Phoenix instruction, if the querier receives the Phoenix instruction, it will not be able to process the Phoenix instruction. In light of this, there may be further deployed a connector between the storage device and the querier, to realize the conversion of the SparkSQL instruction and the Phoenix instruction. In this example of the present disclosure, an index table may be created in the storage device to record the correspondence between the attribute value of the metadata and the RowKey in the HBase table (for example, the correspondence between "Beijing" and "001" in Table 1). Thus, if the Phoenix instruction does not contain the RowKey "001", but contains the attribute value "Beijing", the storage device queries the attribute value "Beijing" in the index table to obtain the RowKey "001", and then queries the RowKey "001" in Table 1 to obtain the data of the first row. The above-described method does not require scanning the full HBase table, thereby improving the query performance and the query efficiency.

The example of the present disclosure may relate to one or a combination of any of the following processes: an index table creation process, a data query process, a data storage process, an index table deletion process, and an index table retrieval process.

Figure 2:
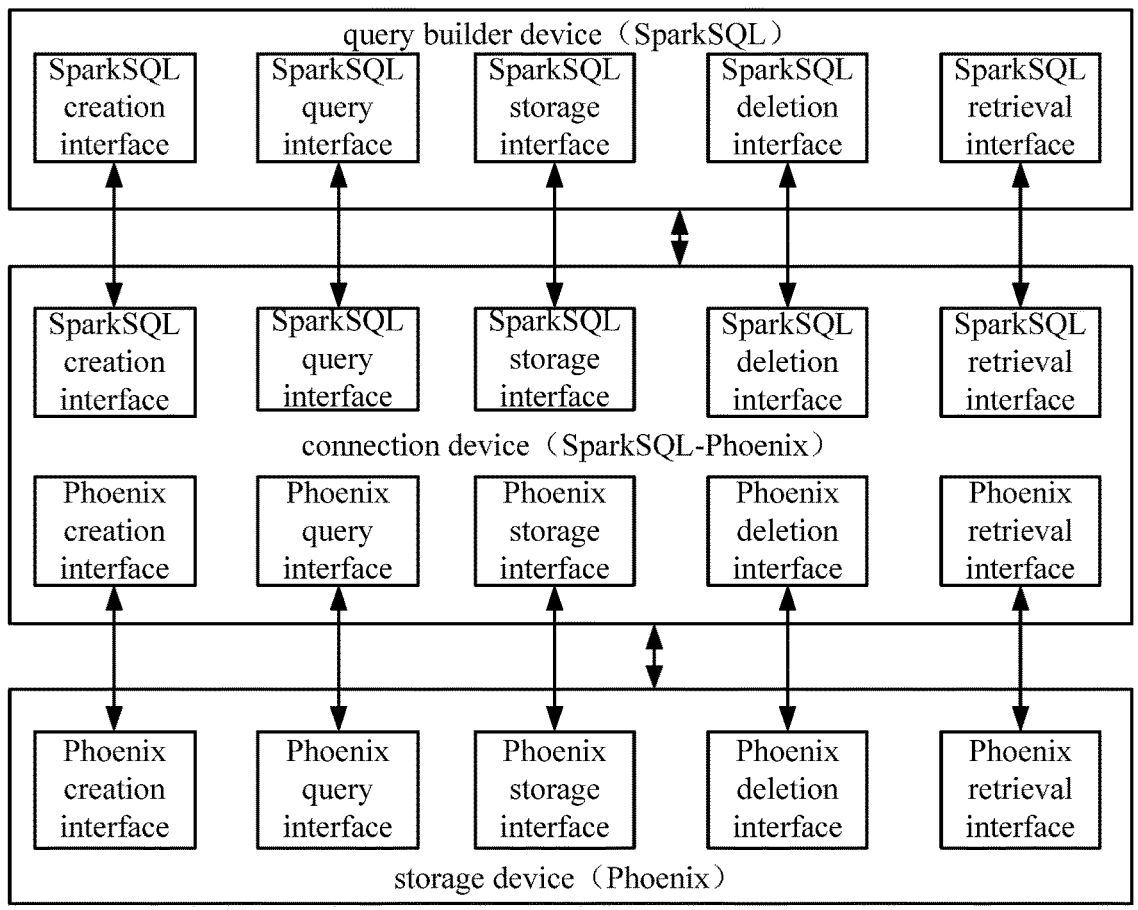
FIG. 2 is a structural diagram of a data query system in one example of the present disclosure.

As shown in FIG. 2, the querier may be provided with a SparkSQL creation interface based on which a SparkSQL creation instruction is generated and sent. The SparkSQL creation instruction is used to create an index table. The connector may be provided with a SparkSQL creation interface and a Phoenix creation interface. Based on the SparkSQL creation interface, the connector is capable of analyzing the SparkSQL creation instruction. Based on the Phoenix creation interface, the connector is capable of generating and sending a Phoenix creation instruction according to the content obtained by analyzing the SparkSQL creation instruction.

The Phoenix creation instruction is used to create an index table. The storage device may be provided with a Phoenix creation interface. Based on the Phoenix creation interface, the storage device is capable of analyzing the Phoenix creation instruction and creating an index table according to the content obtained by analyzing the Phoenix creation instruction.

As shown in FIG. 2, the querier may be provided with a SparkSQL query interface. Based on the SparkSQL query interface, the querier is capable of generating and sending a SparkSQL query instruction, which is used to query data, and is capable of processing a SparkSQL response instruction in response to the SparkSQL query instruction.

The connector may be provided with a SparkSQL query interface and a Phoenix query interface. Based on the SparkSQL query interface, the connector is capable of analyzing the SparkSQL query instruction. Based on the Phoenix query interface, the connector is capable of generating and sending a Phoenix query instruction according to the content obtained by analyzing the SparkSQL query instruction. In addition, based on the Phoenix query interface, the connector is also capable of analyzing a Phoenix response instruction in response to the Phoenix query instruction. Based on the SparkSQL query interface, the connector is capable of generating and sending a SparkSQL response instruction according to the content obtained by analyzing the Phoenix response instruction.

The storage device may be provided with a Phoenix query interface. Based on the Phoenix query interface, the storage device is capable of analyzing the Phoenix query instruction, performing the query, and generating and sending a Phoenix response instruction according to the query result.

As shown in FIG. 2, the querier may be provided with a SparkSQL storage interface. Based on the SparkSQL storage interface, a SparkSQL storage instruction is generated and sent. The SparkSQL storage instruction is used to store data. The connector may be provided with a SparkSQL storage interface and a Phoenix storage interface. Based on the SparkSQL storage interface, the connector is capable of analyzing the SparkSQL storage instruction. Based on the Phoenix storage interface, the connector is capable of generating and sending a Phoenix storage instruction according to the content obtained by analyzing the SparkSQL storage instruction. The Phoenix store instruction is used to store data. The storage device may be provided with a Phoenix storage interface. Based on the Phoenix storage interface, the storage device is capable of analyzing the Phoenix storage instruction and storing relevant data according to the content obtained by analyzing the Phoenix storage instruction.

As shown in FIG. 2, the querier may be provided with a SparkSQL deletion interface. Based on the SparkSQL deletion interface, a SparkSQL deletion instruction is generated and sent. The SparkSQL deletion instruction is used to delete the index table. The connector may be provided with the SparkSQL deletion interface and a Phoenix deletion interface. Based on the SparkSQL deletion interface, the connector is capable of analyzing the SparkSQL deletion instruction. Based on the Phoenix deletion interface, the connector is capable of generating and sending a Phoenix deletion instruction according to the content obtained by analyzing the SparkSQL deletion instruction. The Phoenix deletion instruction is used to delete the index table. The storage device may be provided with a Phoenix deletion interface. Based on the Phoenix deletion interface, the storage is capable of analyzing the Phoenix deletion instruction and deleting the index table according to the content obtained by analyzing the Phoenix deletion instruction.

As shown in FIG. 2, the querier may be provided with a SparkSQL retrieval interface. Based on the SparkSQL retrieval interface, the querier is capable of generating and sending a SparkSQL retrieval instruction. The SparkSQL retrieval instruction is used to retrieve the index table and is capable of processing a SparkSQL response instruction in response to the SparkSQL retrieval instruction.

The connector may be provided with a SparkSQL retrieval interface and a Phoenix retrieval interface. Based on the SparkSQL retrieval interface, the connector is capable of analyzing a SparkSQL retrieval instruction. Based on the Phoenix retrieval interface, the connector is capable of generating and sending a Phoenix retrieval instruction according to the content obtained by analyzing the SparkSQL retrieval instruction. In addition, based on the Phoenix retrieval interface, the connector is also capable of analyzing a Phoenix response instruction in response to the Phoenix retrieval instruction. Based on the SparkSQL retrieval interface, the connector is capable of generating and sending a SparkSQL response instruction according to the content obtained by analyzing the Phoenix response instruction.

The storage device may be provided with a Phoenix retrieval interface. Based on the Phoenix retrieval interface, the storage device is capable of analyzing a Phoenix retrieval instruction, retrieving the index table, and generating and sending a Phoenix response instruction.

Figure 3:
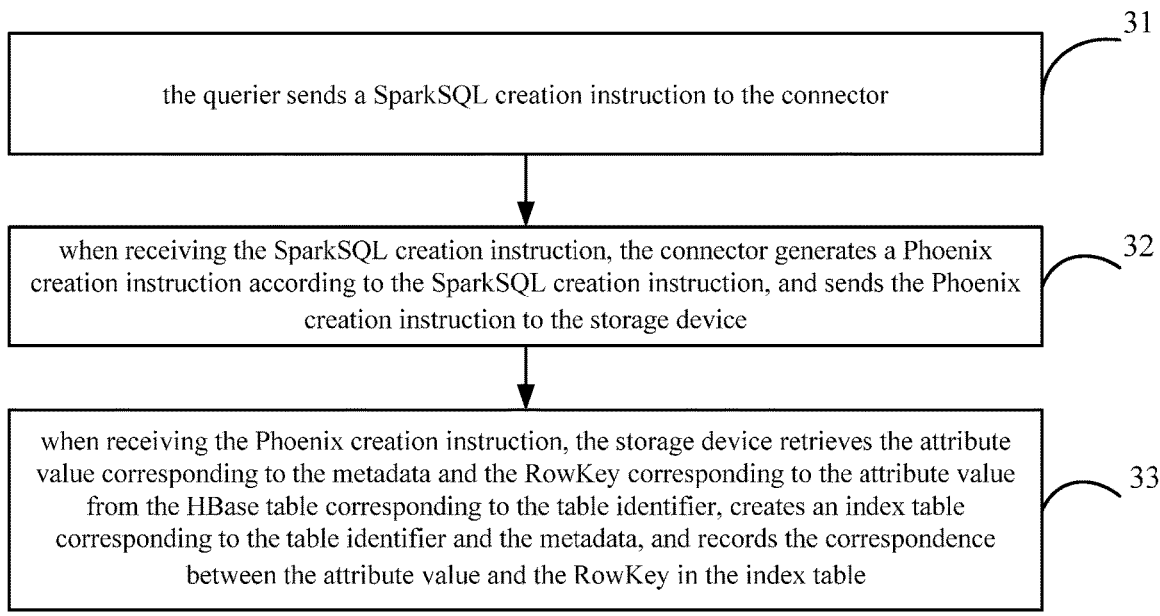
FIG. 3 is a flowchart of a method for creating an index table in one example of the present disclosure.

In the afore-described application scenario, the index table creation process is described with reference to the flowchart of FIG. 3.

In a block 31, the querier sends a SparkSQL creation instruction (for creating an index table) to the connector.

The SparkSQL creation instruction contains the table identifier of the HBase table and the metadata of the HBase table. For example, if an index table is to be created for the HBase table of Table 1, with the metadata "Phone Number" as an index of the index table, the SparkSQL creation instruction may include the table identifier of the HBase table and the metadata "Phone Number".

In a block 32, when receiving the SparkSQL creation instruction, the connector generates a Phoenix creation instruction according to the SparkSQL creation instruction, and sends the Phoenix creation instruction to the storage device.

Specifically, the connector may analyze the SparkSQL creation instruction to obtain the table identifier of the HBase table and the metadata of the HBase table, and generate a Phoenix creation instruction according to the table identifier and the metadata, that is, the Phoenix creation instruction contains the table identifier of the HBase table and the metadata of the HBase table (e.g., "Phone Number").

In a block 33, when receiving the Phoenix creation instruction, the storage device retrieves the attribute value corresponding to the metadata and the RowKey corresponding to the attribute value from the HBase table corresponding to the table identifier, creates an index table corresponding to the table identifier and the metadata, and records the correspondence between the attribute value and the RowKey in the index table.

For example, the storage device may obtain the attribute value 18611111111 corresponding to the metadata "Phone Number" and the RowKey 001 corresponding to the attribute value from Table 1, and record the correspondence between the attribute value 18611111111 and the RowKey 001 in the index table, and so on, thereby obtaining an index table of Table 2.

TABLE 2

| Phone Number | RowKey |
|---|---|
| 18611111111 | 001 |
| 18622222222 | 002 |
| 18633333333 | 003 |
| 18644444444 | 004 |

In one example, assuming that the table identifier of the HBase table of Table 1 is A, the storage device may, after creating the index table of Table 2, send the table identifier A and the metadata "Phone Number" to the connector. The connector records the correspondence between the table identifier and the metadata in a mapping table stored in the connector. Such correspondence indicates that an index table corresponding to the table identifier and the metadata exists in the storage device.

Based on the foregoing processing flow, the creation of the index table may be completed. Further, data query may be completed based on the index table.

Figure 4:
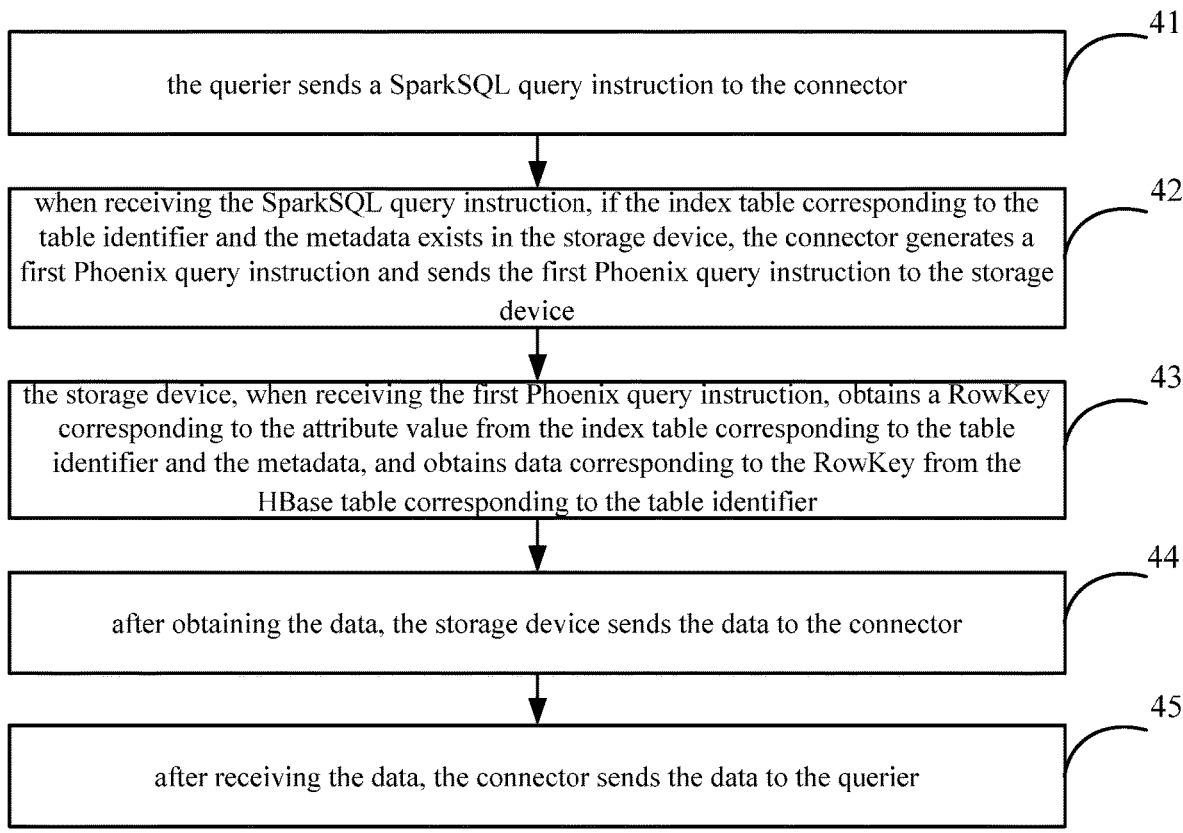
FIG. 4 is a flowchart of a method of data query in one example of the present disclosure.

The data query process is described below with reference to the flowchart of FIG. 4.

In a block 41, the querier sends a SparkSQL query instruction (for data query) to the connector. The SparkSQL query instruction contains a table identifier of the HBase table, metadata, and an attribute value corresponding to the metadata. For example, if data corresponding to "18611111111" is queried from the HBase table of Table 1, the SparkSQL query instruction may include the table identifier A of the HBase table, the metadata "Phone Number", and the attribute value "18611111111" corresponding to "Phone Number".

In a block 42, when receiving the SparkSQL query instruction, if the index table corresponding to the table identifier and the metadata exists in the storage device, the connector generates a first Phoenix query instruction and sends the first Phoenix query instruction to the storage device. If there is no index table in the storage device corresponding to the table identifier and the metadata, the connector generates a second Phoenix query instruction and sends the second Phoenix query instruction to the storage device.

When receiving the SparkSQL query instruction, the connector analyzes the SparkSQL query instruction to obtain the table identifier of the HBase table, the metadata, and the attribute value corresponding to the metadata. Then, the connector may determine whether there is an index table in the storage device corresponding to the table identifier and the metadata.

The first Phoenix query instruction contains an HBase table identifier, metadata, and an attribute value corresponding to the metadata.

The second Phoenix query instruction contains an HBase table identifier and an attribute value corresponding to the metadata. Alternatively, the second Phoenix query instruction contains an HBase table identifier, metadata, and an attribute value corresponding to the metadata.

The process that "the connector determines whether there is an index table in the storage device corresponding to the table identifier and the metadata" may be performed as follows. If the connector maintains the mapping table locally, the connector analyzes the SparkSQL query instruction to obtain the table identifier and the metadata, and then queries the mapping table whether there is a correspondence between the table identifier and the metadata. If yes, the connector determines that the storage device contains an index table corresponding to the table identifier and the metadata. Otherwise, the connector determines that the index table does not exist in the storage device.

Alternatively, the connector, after analyzing the SparkSQL query instruction to obtain the table identifier and the metadata, sends the storage device a Phoenix management instruction which includes the table identifier and the metadata. The storage device, when receiving the Phoenix management instruction, queries local index table corresponding to the table identifier and the metadata, and sends a Phoenix response instruction containing the query result to the connector. The connector determines according to the query result whether the storage device has an index table corresponding to the table identifier and the metadata.

In a block 43, the storage device, when receiving the first Phoenix query instruction, obtains a RowKey corresponding to the attribute value from the index table corresponding to the table identifier and the metadata, and obtains a row of data (data row) corresponding to the RowKey from the HBase table corresponding to the table identifier.

For example, the storage device may analyze the first Phoenix query instruction to obtain the table identifier A, the metadata "Phone Number", and the attribute value "18611111111". The index table corresponding to the table identifier A and the metadata "Phone Number" is shown in Table 2. The storage device may obtain the RowKey 001 corresponding to the attribute value "18611111111" from Table 2. The HBase table corresponding to the table identifier A is shown in Table 1. The storage device can obtain from Table 1 data row corresponding to the RowKey 001, including "001, San Zhang, Beijing, 28, 18611111111".

In a further example, when receiving the second Phoenix query instruction, the storage device may analyze the second Phoenix query instruction to obtain the table identifier A and the attribute value "San Zhang". The HBase table corresponding to the table identifier A is shown in Table 1. The storage device then scans the full table of Table 1, obtaining data row corresponding to "San Zhang", including "001, San Zhang, Beijing, 28, 18611111111".

When the connector generates the Phoenix query instruction, the Phoenix query instruction may further include a special flag indicating that the Phoenix query instruction is the first Phoenix query instruction or the second Phoenix query instruction. When receiving the first Phoenix query instruction, the storage device may first query the index table and then query the HBase table. When the storage device receives the second Phoenix query instruction, it may directly query the HBase table.

In a block 44, after obtaining the data row, the storage device sends the data row to the connector.

In a block 45, after receiving the data row, the connector sends the data row to the querier.

The storage device may generate a Phoenix response instruction in response to the first Phoenix query instruction or the second Phoenix query instruction, and send the Phoenix response instruction to the connector. The Phoenix response instruction contains the queried data row. After receiving the Phoenix response instruction, the connector analyzes the Phoenix response instruction to obtain the queried data row, generates a SparkSQL response instruction in response to the SparkSQL query instruction, and sends the SparkSQL response instruction to the querier. The querier analyzes the SparkSQL response instruction to obtain the data row.

Based on the afore-described processing flow, the data query is completed.

Figure 5:
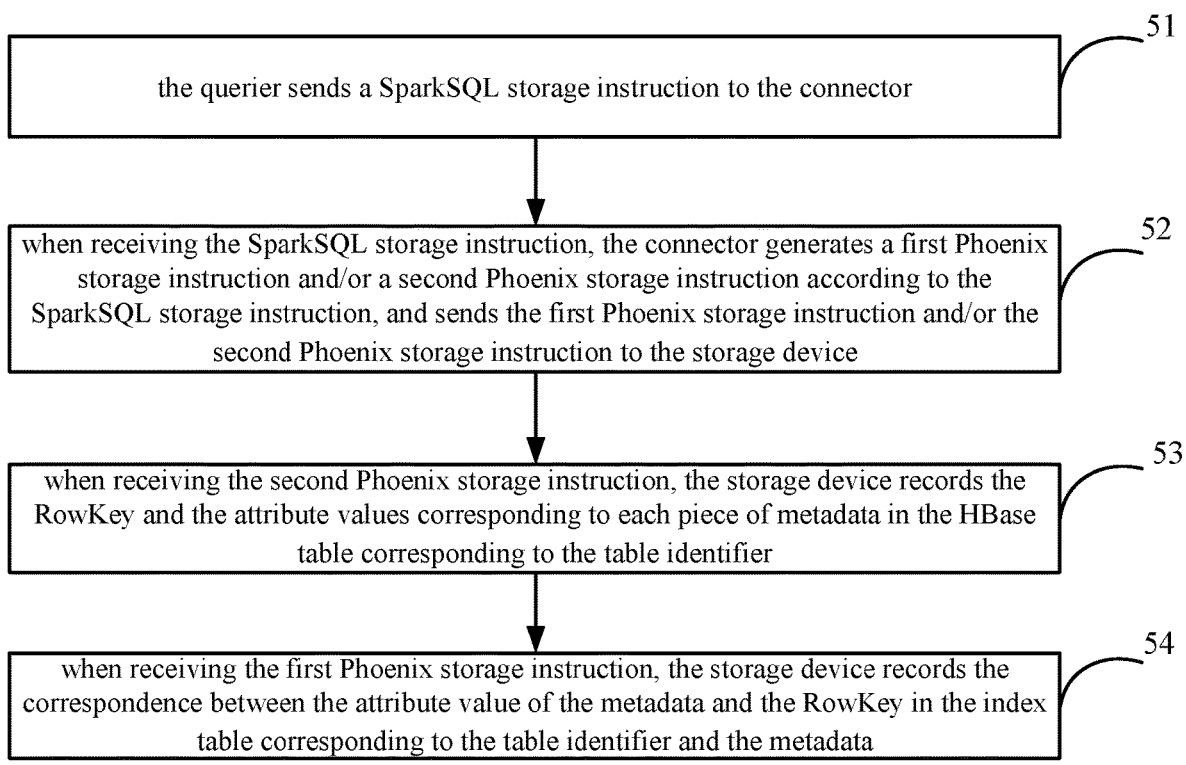
FIG. 5 is a flowchart of a method for storing data in one example of the present disclosure.

In addition, based on the above index table, data storage may be completed. The data storage process will be described below with reference to the flowchart shown in FIG. 5.

In a block 51, the querier sends a SparkSQL storage instruction (for storing data) to the connector.

The SparkSQL storage instruction contains a table identifier of the HBase table, at least one piece of metadata of the HBase table, attribute values corresponding to each piece of metadata, and a RowKey. For example, if data including RowKey "005", Name "Qi Han", Address "Shenzhen", Age "50", and Phone Number "18655555555" is to be stored in the HBase table shown in Table 1, the SparkSQL storage instruction may include: the table identifier A of the HBase table, the correspondence between the metadata "Name" and the attribute value "Qi Han", the correspondence between the metadata "Address" and the attribute value "Shenzhen", the correspondence between the metadata "Age" and the attribute value "50", the correspondence between the metadata "Phone Number" and the attribute value "18655555555", and the RowKey "005".

In a block 52, when receiving the SparkSQL storage instruction, the connector generates a first Phoenix storage instruction and/or a second Phoenix storage instruction according to the SparkSQL storage instruction, and sends the first Phoenix storage instruction and/or the second Phoenix storage instruction to the storage device.

When receiving the SparkSQL storage instruction, the connector analyzes the SparkSQL storage instruction to obtain the table identifier of the HBase table, at least one piece of metadata of the HBase table, the attribute value corresponding to each piece of metadata, and the RowKey.

The following operation is performed for each piece of metadata: if the storage device has an index table corresponding to the table identifier and the metadata, the first Phoenix storage instruction is generated according to the SparkSQL storage instruction, and is sent to the storage device; otherwise, the first Phoenix storage instruction is not generated. The first Phoenix storage instruction contains the table identifier, the metadata, an attribute value corresponding to the metadata, and the RowKey.

In addition, for each piece of metadata in the SparkSQL storage instruction, the connector determines whether there is an index table corresponding to the table identifier and the metadata in the storage device. The determining method is the same as in the block 42, and is not repeated herein.

For example, for the metadata "Name", "Address", and "Age", it is determined that the storage device does not have a corresponding index table, and the flow is terminated. For the metadata "Phone Number", it is determined that the storage device has a corresponding index table, and the connector may generate a first Phoenix storage instruction which includes the table identifier A, the metadata "Phone Number", the attribute value "18655555555", and the RowKey 005.

When receiving the SparkSQL storage instruction, the connector may further generate a second Phoenix storage instruction which includes the table identifier, the at least one piece of metadata, the attribute values corresponding to each piece of metadata, and the RowKey.

The first Phoenix storage instruction may instruct the storage device to store data in the index table. The second Phoenix storage instruction may instruct the storage device to store data in the HBase table.

When the connector generates the Phoenix storage instruction, the Phoenix storage instruction may further include a special flag indicating that the Phoenix storage instruction is the first Phoenix storage instruction or the second Phoenix storage instruction. When the storage device receives the first Phoenix storage instruction, a block 54 is executed; when the storage device receives the second Phoenix storage instruction, a block 53 is executed.

In the block 53, when receiving the second Phoenix storage instruction, the storage device records the RowKey and the attribute values corresponding to each piece of metadata in the HBase table corresponding to the table identifier.

For example, the storage device analyzes the second Phoenix storage instruction to obtain the table identifier A of the HBase table, the correspondence between the metadata "Name" and the attribute value "Qi Han", the correspondence between the metadata "Address" and the attribute value "Shenzhen", the correspondence between the metadata "Age" and the attribute value "50", the correspondence between the metadata "Phone Number" and the attribute value "18655555555", and the RowKey "005". Therefore, a row of data is added to the HBase table shown in Table 1, e.g., the row of data with the RowKey 005 as shown in Table 3.

TABLE 3

| | Column family A | | | Column family B | |
|---|---|---|---|---|---|
| RowKey | Name | Address | Age | Phone Number | Mailbox |
| 001 | San Zhang | Beijing | 28 | 18611111111 | . . . |
| 002 | Si Li | Shanghai | 33 | 18622222222 | . . . |
| 003 | Wu Wang | Hangzhou | 40 | 18633333333 | . . . |
| 004 | Liu Zhao | Guangzhou | 43 | 18644444444 | . . . |
| 005 | Qi Han | Shenzhen | 50 | 18655555555 | . . . |

If the RowKey included in the second Phoenix storage instruction already exists in the HBase table, the corresponding attribute value included in the second Phoenix storage instruction may be added to the corresponding location of the RowKey corresponding to the corresponding metadata in the HBase table. If the HBase table does not have the RowKey included in the second Phoenix storage instruction, a new data row may be added to the HBase table, which records the RowKey and the attribute values of each piece of metadata included in the second Phoenix storage instruction.

In the block 54, when receiving the first Phoenix storage instruction, the storage device records the correspondence between the attribute value of the metadata and the RowKey in the index table corresponding to the table identifier and the metadata.

For example, the storage device analyzes the first Phoenix storage instruction to obtain the table identifier A, the metadata "Phone Number", the attribute value "18655555555", and the RowKey 005. Therefore, the correspondence between the attribute value "18655555555" and the RowKey 005 may be recorded in the index table shown in Table 2, obtaining the index table shown in Table 4.

TABLE 4

| Phone Number | RowKey |
|---|---|
| 18611111111 | 001 |
| 18622222222 | 002 |
| 18633333333 | 003 |
| 18644444444 | 004 |
| 18655555555 | 005 |

Based on the index table, deletion of the index table may be realized. The index table deletion process is described below.

In one case, the querier sends the connector a SparkSQL deletion instruction containing the table identifier of the HBase table and the metadata of the HBase table. When receiving the SparkSQL deletion instruction, the connector generates a Phoenix deletion instruction according to the SparkSQL deletion instruction, and may send the Phoenix deletion instruction to the storage device. The Phoenix deletion instruction may include the table identifier and the metadata. When receiving the Phoenix deletion instruction, the storage device analyzes the Phoenix deletion instruction to obtain the table identifier of the HBase table and the metadata of the HBase table, and deletes the index table corresponding to the table identifier and the metadata.

For example, the Phoenix deletion instruction contains the table identifier A and the metadata "Phone Number". Thus, if the index table shown in Table 4 exists in the storage device, the storage device may delete Table 4 according to the Phoenix deletion instruction.

In one other case, the querier sends the connector a SparkSQL deletion instruction containing a table identifier of the HBase table, metadata of the HBase table, and an attribute value corresponding to the metadata.

When receiving the SparkSQL deletion instruction, the connector may generate a Phoenix deletion instruction according to the SparkSQL deletion instruction, and may send the Phoenix deletion instruction to the storage device, where the Phoenix deletion instruction may include the table identifier, the metadata, and the attribute value corresponding to the metadata.

When receiving the Phoenix deletion instruction, the storage device may analyze the Phoenix deletion instruction to obtain the table identifier of the HBase table, the metadata of the HBase table, and the attribute value corresponding to the metadata, and delete the row of data including the above attribute value from the index table corresponding to table identifier and the metadata.

For example, the Phoenix deletion instruction contains a table identifier (e.g. Table A), metadata (e.g., Phone Number), and an attribute value (e.g., 18655555555). Thus, if the storage device contains an index table shown in Table 4, the storage device may delete corresponding data from Table 4 according to the Phoenix deletion instruction. The index table after the deleting is shown in Table 2.

Based on the index table, the retrieval of the index table may be realized. The index table retrieval process is described below.

In one case, the querier sends the connector a SparkSQL retrieval instruction containing the table identifier of the HBase table and the metadata of the HBase table. When receiving the SparkSQL retrieval instruction, the connector generates a Phoenix retrieval instruction according to the SparkSQL retrieval instruction, and may send the Phoenix retrieval instruction to the storage device, where the Phoenix retrieval instruction may contain the table identifier and the metadata.

When receiving the Phoenix retrieval instruction, the storage device analyzes the Phoenix retrieval instruction to obtain the table identifier of the HBase table and the metadata of the HBase table, and obtains the index table corresponding to the table identifier and the metadata. Then, the index table corresponding to the table identifier and the metadata may be sent to the querier through the connector.

In the process that "the index table corresponding to the table identifier and the metadata are sent to the querier through the connector", the storage device may send the connector a Phoenix response instruction in response to the Phoenix retrieval instruction, where the Phoenix response instruction contains the index table. Then the connector may send the querier a SparkSQL response instruction in response to the SparkSQL retrieval instruction, where the SparkSQL response instruction contains the index table.

For example, the Phoenix retrieval instruction contains a table identifier (e.g., Table A) and metadata (e.g., Phone Number). Thus, if the storage device has an index table shown in Table 4, the storage device can send Table 4 to the querier according to the Phoenix retrieval instruction.

In one other case, the querier sends the connector a SparkSQL retrieval instruction, where the SparkSQL retrieval instruction may include a table identifier of the HBase table, metadata of the HBase table, and an attribute value corresponding to the metadata.

When receiving the SparkSQL retrieval instruction, the connector may generate a Phoenix retrieval instruction according to the SparkSQL retrieval instruction, and may send the Phoenix retrieval instruction to the storage device, where the Phoenix retrieval instruction may include the table identifier, the metadata, and the attribute value corresponding to the metadata.

When receiving the Phoenix retrieval instruction, the storage device may analyze the Phoenix retrieval instruction to obtain the table identifier of the HBase table, the metadata of the HBase table, and the attribute value corresponding to the metadata, and may acquire the row of data including the attribute value from the index table corresponding to the table identifier and the metadata.

Then, the storage device sends the row of data to the querier through the connector. Specifically, the storage device may send the connector a Phoenix response instruction in response to the Phoenix retrieval instruction, where the Phoenix response instruction may include the row of data. After that, the connector may send the querier a SparkSQL response instruction in response to the SparkSQL retrieval instruction, where the SparkSQL response instruction may include the row of data.

For example, the Phoenix retrieval instruction includes a table identifier (e.g., Table A), metadata (e.g., Phone Number), and an attribute value (e.g., 18655555555). Thus, if the storage device has the index table shown in Table 4, the storage device may send the corresponding row of data (including "18655555555" of "Phone Number", and "005" of "RowKey") in Table 4 according to the Phoenix retrieval instruction to the querier.

Based on the foregoing technical solution, in the example of the present disclosure, there is created an index table recording the attribute value of the metadata of the HBase table and the RowKey of the HBase table in correspondence. Thereby, when a Phoenix query instruction is received, even if the Phoenix query instruction does not contain the RowKey of the HBase table, and contains, instead, the attribute value corresponding to the metadata of the HBase table, the RowKey of the HBase table may be obtained by querying the attribute value in the index table. Then, the corresponding row of data may be obtained by querying the RowKey in the HBase table. The afore-described method saves need of scanning the entire HBase table, which may improve the query performance.

In an actual application, to avoid the complexity of query caused by overstuffed contents in one single HBase table, the storage device may have multiple HBase tables stored therein. In one example, there is provided two HBase tables. For the ease of distinguishing the two HBase tables, one of the HBase tables is referred to as HBase table, of which the table identifier is the first table identifier. For example, Table 1 is the HBase table, having the first table identifier of Table A. The other HBase table is referred to the associated HBase table corresponding to the HBase table, of which the table identifier is the second table identifier. Table 5 is an example of the associated HBase table, having the second table identifier of Table B.

TABLE 5

| | Column family A | |
|---|---|---|
| RowKey | Phone Number | ID Number |
| 011 | 18611111111 | 100000000000000000 |
| 012 | 18622222222 | 200000000000000000 |
| 013 | 18633333333 | 300000000000000000 |
| 014 | 18644444444 | 400000000000000000 |

In this application scenario, when the HBase table and the associated HBase table are created, in order to associate the data of the HBase table with that of the associated HBase table, the HBase table and the associated HBase table should have the same metadata, as shown in Table 1 and Table 5 with the same metadata "Phone Number". Moreover, when the index table is created for the HBase table shown in Table 1, the index in the index table should be the same metadata; that is, when a flow shown in FIG. 3 is employed to create the index table, the metadata contained in the SparkSQL creation instruction may be "Phone Number". Thus, the index table records the correspondence between the attribute value corresponding to the metadata "Phone Number" and the RowKey.

Figure 6:
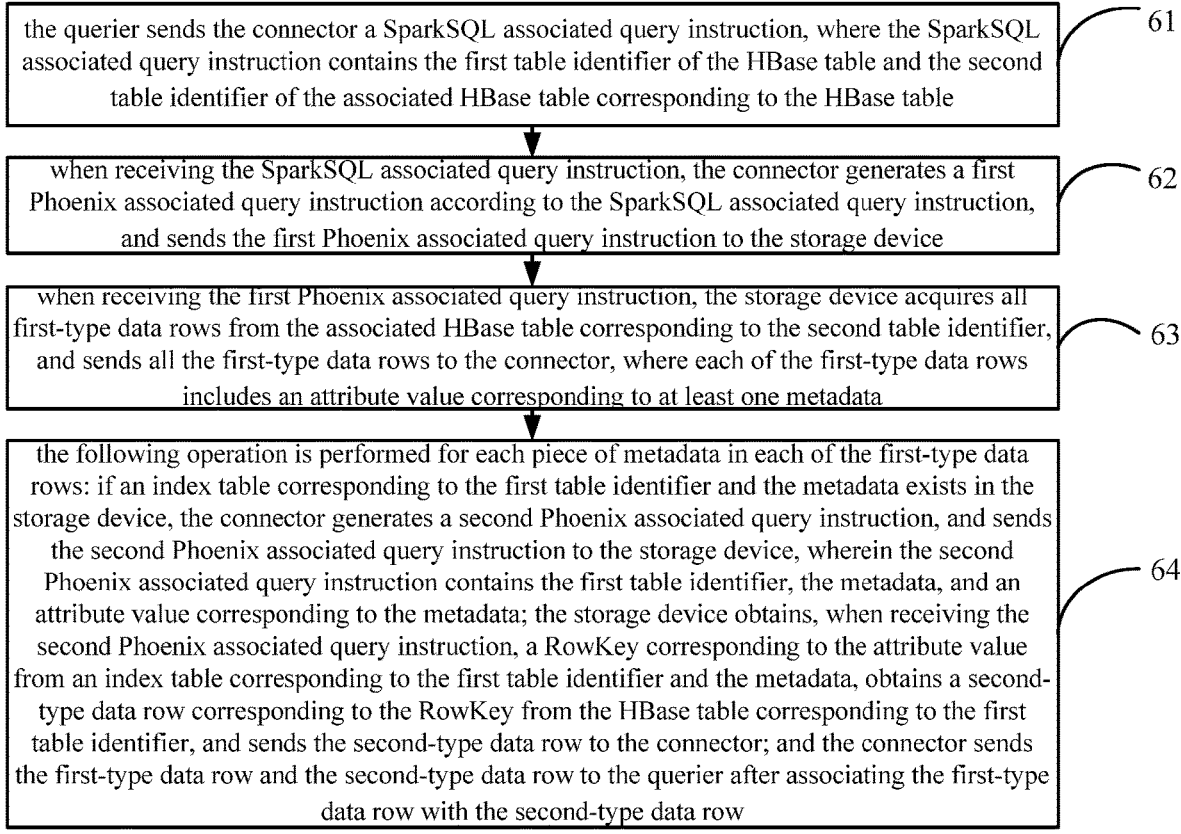
FIG. 6 is a flowchart of a method of data query in one other example of the present disclosure.

In the above application scenario, the data query process is described with reference to the flowchart of FIG. 6.

In a block 61, the querier sends the connector a SparkSQL associated query instruction, where the SparkSQL associated query instruction contains the first table identifier of the HBase table and the second table identifier of the associated HBase table corresponding to the HBase table. The SparkSQL associated query instruction may include only the first table identifier (e.g., Table A) and the second table identifier (e.g., Table B), and may not include the metadata, the attribute value corresponding to the metadata, and the like.

In a block 62, when receiving the SparkSQL associated query instruction, the connector generates a first Phoenix associated query instruction according to the SparkSQL associated query instruction, and sends the first Phoenix associated query instruction to the storage device. The connector may analyze the SparkSQL associated query instruction to obtain the first table identifier and the second table identifier, and then, the connector may generate a first Phoenix associated query instruction containing the second table identifier.

In one example, the connector may analyze the SparkSQL associated query instruction to obtain the two table identifiers. To distinguish the two table identifiers, the data volume of the HBase table corresponding to each of the two table identifiers may be obtained. The table identifier of the HBase table having a larger data volume is determined as the first table identifier. The table identifier of the HBase table having a smaller data volume is determined as the second table identifier. When the second table identifier is determined, the first Phoenix associated query instruction containing the second table identifier may be generated.

Generally, when the HBase table and the associated HBase table are created, the data volume of the HBase table is greater than the data volume of the associated HBase table. Therefore, the table identifier of the HBase table is the first table identifier, and the table identifier of the associated HBase table is the second table identifier. Conversely, if the data volume of the HBase table is smaller than the data volume of the associated HBase table, the table identifier of the HBase table is the second table identifier, and the table identifier of the associated HBase table is the first table identifier. The processing flow is the same, where generated is still the first Phoenix associated query instruction containing the second table identifier, which will not be repeated.

In short, the table identifier of either of the HBase table and the associated HBase table with a smaller data volume is determined as the second table identifier.

In one example, when the connector determines the second table identifier, it may further determine whether the data volume of the table corresponding to the second table identifier is less than a threshold value. If yes, the connector generates a first Phoenix associated query instruction containing the second table identifier, and the subsequent blocks are executed. Otherwise, the first Phoenix associated query instruction is not generated, and the HBase table corresponding to the first table identifier and the associated HBase table corresponding to the second table identifier are directly retrieved from the storage device and are sent to the querier, which process will not be further explained.

In one example, in the process that "the connector obtains the data volume of the HBase table corresponding to the table identifier", the connector may obtain the data volume of the HBase table corresponding to the table identifier from the storage device, which is not limited hereto. In a block 63, when receiving the first Phoenix associated query instruction, the storage device acquires all first-type data rows from the associated HBase table corresponding to the second table identifier, and sends all the first-type data rows to the connector, where each of the first-type data rows includes an attribute value corresponding to at least one metadata.

For example, the storage device may obtain all the first-type data rows from the associated HBase table corresponding to the second table identifier "Table B", which is to obtain all the contents of Table 5. After that, the storage device may send all the first-type data rows to the connector. For example, the first-type data row 1 (RowKey 011, Phone Number 18611111111, ID Number 100000000000000000), the first-type data row 2 (RowKey 012, Phone Number 18622222222, ID Number 200000000000000000), and so on may be sent.

In one example, the storage device may send the connector a Phoenix response instruction in response to the first Phoenix associated query instruction. The Phoenix response instruction may include all of the afore-described first-type data rows.

In a block 64, the following operation is performed for each piece of metadata in each of the first-type data rows. If the storage device has the index table corresponding to the first table identifier (the first table identifier included in the SparkSQL associated query instruction) and the metadata, the connector generates a second Phoenix associated query instruction and sends the second Phoenix associated query instruction to the storage device, where the second Phoenix associated query instruction contains the first table identifier, the metadata, and an attribute value corresponding to the metadata. When the storage device receives the second Phoenix associated query instruction, it obtains from the index table corresponding to the first table identifier and the metadata the RowKey corresponding to the attribute value, and obtains a second-type data row corresponding to the RowKey from the HBase table corresponding to the first table identifier and sends the second-type data row to the connector. The connector associates the first-type data row with the second-type data row and sends the result to the querier.

In addition, if the storage device does not have the index table corresponding to the first table identifier and the metadata, the connector may no longer generate the second Phoenix associated query instruction, and, instead, continues to analyze other metadata.

For example, for the metadata "ID Number" of the first-type data row 1, since the storage device does not have the index table corresponding to the first table identifier (Table A) and the metadata "ID Number", the second Phoenix associated query instruction is not generated. For the metadata "Phone Number" of the first-type data row 1, since the storage device has the index table corresponding to the first table identifier (Table A) and the metadata "Phone Number", the connector generates a second Phoenix associated query instruction and sends the second Phoenix associated query instruction to the storage device, where the second Phoenix associated query instruction contains the first table identifier (Table A), the metadata "Phone Number", and the attribute value "18611111111" corresponding to the metadata.

When receiving the second Phoenix associated query instruction, the storage device obtains the RowKey "001" corresponding to the attribute value "18611111111" from Table 2 which is the index table corresponding to the first table identifier (Table A) and the metadata "Phone Number", and obtains the second-type data row 1 "001, San Zhang, Beijing, 28, 18611111111" corresponding to the RowKey "001" from Table 1 which is the HBase table corresponding to the first table identifier (Table A), and then, sends the second-type data row 1 to the connector. The connector associates the first-type data row 1 with the second-type data row 1, and sends the first type of row data 1 and the second type of row data 1 associated with each other to the querier.

After the above processing, the connector completes the association between the first-type data row 1 and the second-type data row 1. After that, the connector may further perform the association on the first-type data row 2, the first-type data row 3, and the first-type data row 4. The association process is similar to that performed on the first-type data row 1, which is not repeated herein.

In the afore-described example, the connector determines whether the storage device includes the index table corresponding to the first table identifier and the metadata. The determination method is described in the block 42, and is not repeated herein.

In the afore-described example, in the process that "the storage device sends the second-type data row to the connector", the storage device sends the connector a Phoenix response instruction in response to the second Phoenix associated query instruction, where the Phoenix response instruction may include the second-type data row, thereby sending the second-type data row to the connector.

In the afore-described example, in the process that "the connector associates the first-type data row with the second-type data row and sends the result to the querier", the connector may send the querier a SparkSQL response instruction in response to the SparkSQL associated query instruction. The SparkSQL response instruction may include the first-type data row and the second-type data row, thereby sending the first-type data row and the second-type data row to the querier.

For example, the connector may send the querier multiple SparkSQL response instructions, the SparkSQL response instruction 1 containing the first-type data row 1 and the second-type data row 1, the SparkSQL response instruction 2 containing the first-type data row 2 and the second-type data row 2, and so on. Alternatively, the connector may send the querier a SparkSQL response instruction containing the association between the first-type data row 1 and the second-type data row 1, and the association between the first-type data row 2 and the second-type data row 2, and so on.

After the above processing, the querier may obtain the association between the first-type data row and the second-type data row in the HBase table and the associated HBase table, without associating by the querier, thereby reducing the workload of the querier.

Based on the afore-described technical solution, when the data volume of the associated HBase table is small, the first-type data row and the second-type data row may be associated by the connector; and the first-type data row and the second-type data row associated with each other may be sent to the querier by the connector. In this way, it can be avoided of sending the HBase table and the associated HBase table to the querier to be associated by the querier, which greatly improves the query performance of the HBase table and the associated HBase table and reduces IO operation.

Figure 7:
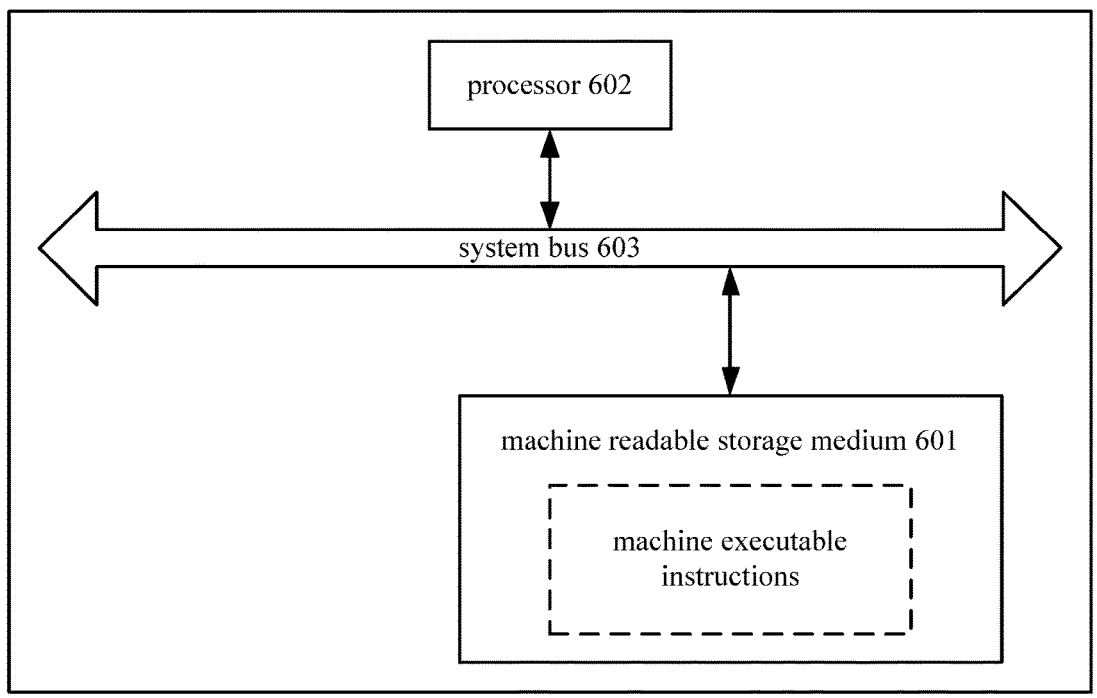
FIG. 7 is a schematic diagram of a hardware structure of a connector in one example of the present disclosure.

Based on the same application concept as the afore-described, the example of the present disclosure further provides a connector, of which the hardware structure is shown in FIG. 7, wherein the connector may comprise a machine readable storage medium 601 and a processor 602, the machine readable storage medium 601 and the processor 602 being capable of communicating via a system bus 603.

The machine readable storage medium 601 may store machine executable instructions corresponding to the operations executed by the connector in the afore-described process. The processor 602 is capable of loading and executing the machine executable instructions to implement the operations of the connector. The operations of the connector may include: receiving a SparkSQL query instruction sent from a querier, wherein the SparkSQL query instruction contains a table identifier of an HBase table, metadata of the HBase table, and an attribute value corresponding to the metadata; generating, if an index table corresponding to the table identifier and the metadata exists in a storage device, a first Phoenix query instruction, and sending the first Phoenix query instruction to the storage device, wherein the index table is configured to record a correspondence between an attribute value of metadata of an HBase table and a RowKey of the HBase table, and the first Phoenix query instruction contains the table identifier, the metadata, and the attribute value, and causes the storage device to obtain a RowKey corresponding to the attribute value from the index table corresponding to the table identifier and the metadata, obtain a data row corresponding to the RowKey from the HBase table corresponding to the table identifier, and send the data row to the connector; and sending the data row received to the querier.

In one example, the machine executable instructions further cause the processor 602 to: receive a SparkSQL creation instruction sent from the querier, wherein the SparkSQL creation instruction contains a table identifier of an HBase table and metadata of the HBase table; and generate a Phoenix creation instruction and send the Phoenix creation instruction to the storage device, wherein the Phoenix creation instruction contains the table identifier and the metadata, and causes the storage device to obtain an attribute value corresponding to the metadata and a RowKey corresponding to the attribute value from the HBase table corresponding to the table identifier, create an index table corresponding to the table identifier and the metadata, and record in the index table a correspondence between the attribute value and the RowKey.

In one example, the machine executable instructions further cause the processor 602 to: receive a SparkSQL storage instruction sent from the querier, wherein the SparkSQL storage instruction contains a table identifier of an HBase table, at least one piece of metadata of the HBase table, an attribute value corresponding to each piece of metadata, and a RowKey; and perform the following operation for each piece of metadata: if an index table corresponding to the table identifier and the metadata exists in the storage device, generating a first Phoenix storage instruction and sending the first Phoenix storage instruction to the storage device, wherein the first Phoenix storage instruction contains the table identifier, the metadata, an attribute value corresponding to the metadata, and a RowKey corresponding to the attribute value, and causes the storage device to record a correspondence between the attribute value and the RowKey in the index table corresponding to the table identifier and the metadata.

In one example, the machine executable instructions further cause the processor 602 to: generate a second Phoenix storage instruction and send the second Phoenix storage instruction to the storage device, wherein the second Phoenix storage instruction contains the table identifier, the at least one piece of metadata, the attribute value corresponding to each piece of metadata, and the RowKey, and causes the storage device to record a correspondence between the RowKey and the attribute value corresponding to each piece of metadata in an HBase table corresponding to the table identifier.

In one example, the machine executable instructions further cause the processor 602 to: receive a SparkSQL deletion instruction sent by the querier; and generate a Phoenix deletion instruction and send the Phoenix deletion instruction to the storage device, wherein the Phoenix deletion instruction is either of an instruction which contains a table identifier of an HBase table and metadata of the HBase table, and which causes the storage device to delete an index table corresponding to the table identifier and the metadata, and an instruction which contains a table identifier of an HBase table, metadata of the HBase table, and an attribute value corresponding to the metadata, and which causes the storage device to delete a data row corresponding to the attribute value from an index table corresponding to the table identifier and the metadata.

In one example, the machine executable instructions further cause the processor 602 to: receive a SparkSQL retrieval instruction sent from the querier; generate a Phoenix retrieval instruction and send the Phoenix retrieval instruction to the storage device, wherein the Phoenix retrieval instruction is either of an instruction which contains a table identifier of an HBase table and metadata of the HBase table, and which causes the storage device to send an index table corresponding to the table identifier and the metadata to the connector, and an instruction which contains a table identifier of an HBase table, metadata of the HBase table, and an attribute value corresponding to the metadata, and which causes the storage device to obtain a data row corresponding to the attribute value from an index table corresponding to the table identifier and the metadata and send the data row to the connector; and send the index table or the data row to the querier when receiving the index table or the data row.

In one example, the machine executable instructions further cause the processor 602 to: receive a SparkSQL associated query instruction sent from the querier, wherein the SparkSQL associated query instruction contains a first table identifier of an HBase table and a second table identifier of an associated HBase table corresponding to the HBase table; generate a first Phoenix associated query instruction and send the first Phoenix associated query instruction to the storage device, wherein the first Phoenix associated query instruction contains the second table identifier, and causes the storage device to obtain all first-type data rows from the associated HBase table corresponding to the second table identifier and send all the first-type data rows to the connector, each of the first-type data rows including an attribute value corresponding to at least one piece of metadata; and perform the following operation for each piece of metadata in each of the first-type data rows: if an index table corresponding to the first table identifier and the metadata exists in the storage device, generating a second Phoenix associated query instruction, and sending the second Phoenix associated query instruction to the storage device, wherein the second Phoenix associated query instruction contains the first table identifier, the metadata, and an attribute value corresponding to the metadata, and causes the storage device to obtain a RowKey corresponding to the attribute value from an index table corresponding to the first table identifier and the metadata, obtain a second-type data row corresponding to the RowKey from the HBase table corresponding to the first table identifier, and send the second-type data row to the connector; and send the first-type data row and the second-type data row to the querier after associating the first-type data row with the second-type data row.

As one example, the machine readable storage medium 601 may be any electronic, magnetic, optical, or other physical storage device, and may contain or store information such as executable instructions, data, etc. Examples of the machine readable storage medium include random access storage (RAM), volatile storage, non-volatile storage, flash storage, storage driver (e.g., hard disk drive), solid state disk, any type of storage disk (e.g., CD, DVD, etc.), or any similar storage medium, or any proper combination thereof.

The foregoing is the example of the present disclosure and is not used to limit the present disclosure. A number of variations and modifications of the present disclosure may occur to one skilled in the art. Any modification, equivalent substitution, and improvement made within the scope of the spirits and principles of the present disclosure are to be claimed by the present disclosure.

What is claimed is:

1. A data query method, comprising:
    sending, by a querier, a SparkSQL query instruction to a connector, wherein the SparkSQL query instruction contains a table identifier of an HBase table, metadata of the HBase table, and an attribute value corresponding to the metadata;
    after receiving by the connector the SparkSQL query instruction and determining that an index table corresponding to the table identifier and the metadata exists in a storage device, generating, by the connector, a first Phoenix query instruction, and sending, by the connector, the first Phoenix query instruction to the storage device, wherein the index table records a correspondence between an attribute value of metadata of an HBase table and a RowKey of the HBase table, and the first Phoenix query instruction contains the table identifier, the metadata, and the attribute value;
    after the storage device receives the first Phoenix query instruction, obtaining, by the storage device, from the index table corresponding to the table identifier and the metadata, a RowKey corresponding to the attribute value, obtaining, by the storage device, from the HBase table corresponding to the table identifier, a data row corresponding to the RowKey, and sending, by the storage device, the data row to the connector; and
    after the connector receives the data row, sending, by the connector, the data row to the querier.

2. The data query method according to claim 1, wherein the method further comprises:
    sending, by the querier, a SparkSQL creation instruction to the connector, wherein the SparkSQL creation instruction contains a table identifier of an HBase table and metadata of the HBase table;
    after the connector receives the SparkSQL creation instruction, generating, by the connector, a Phoenix creation instruction, and sending, by the connector, the Phoenix creation instruction to the storage device, wherein the Phoenix creation instruction contains the table identifier and the metadata; and
    after the storage device receives the Phoenix creation instruction, obtaining, by the storage device, from the HBase table corresponding to the table identifier, an attribute value corresponding to the metadata and a RowKey corresponding to the attribute value, creating, by the storage device, an index table corresponding to the table identifier and the metadata, and recording, by the storage device, in the index table, a correspondence between the attribute value and the RowKey.

3. The data query method according to claim 1, wherein the method further comprises:
    sending, by the querier, a SparkSQL storage instruction to the connector, wherein the SparkSQL storage instruction contains a table identifier of an HBase table, at least one piece of metadata of the HBase table, an attribute value corresponding to each piece of metadata, and a RowKey;
    after the connector receives the SparkSQL storage instruction, performing, by the connector, the following operations for each piece of metadata: if an index table corresponding to the table identifier and the metadata exists in the storage device, generating a first Phoenix storage instruction and sending the first Phoenix storage instruction to the storage device, wherein the first Phoenix storage instruction contains the table identifier, the metadata, an attribute value corresponding to the metadata, and a RowKey corresponding to the attribute value; and
    after the storage device receives the first Phoenix storage instruction, recording, by the storage device, in the index table corresponding to the table identifier and the metadata, a correspondence between the attribute value and the RowKey.

4. The data query method according to claim 3, wherein the method further comprises:
    after the connector receives the SparkSQL storage instruction, generating, by the connector, a second Phoenix storage instruction, and sending, by the connector, the second Phoenix storage instruction to the storage device, wherein the second Phoenix storage instruction contains the table identifier, the at least one piece of metadata, the attribute value corresponding to each piece of metadata, and the RowKey; and
    after the storage device receives the second Phoenix storage instruction, recording, by the storage device, in the HBase table corresponding to the table identifier, a correspondence between the RowKey and the attribute value corresponding to each piece of metadata.

5. The data query method according to claim 1, wherein the method further comprises:
    sending, by the querier, a SparkSQL deletion instruction to the connector;
    after the connector receives the SparkSQL deletion instruction, generating, by the connector, a Phoenix deletion instruction, and sending, by the connector, the Phoenix deletion instruction to the storage device, wherein the Phoenix deletion instruction contains a table identifier of an HBase table and metadata of the HBase table, or the Phoenix deletion instruction contains a table identifier of an HBase table, metadata of the HBase table, and an attribute value corresponding to the metadata; and
    after the storage device receives the Phoenix deletion instruction, if the Phoenix deletion instruction contains the table identifier of the HBase table and the metadata of the HBase table, deleting, by the storage device, an index table corresponding to the table identifier and the metadata; or, if the Phoenix deletion instruction contains the table identifier of the HBase table, the metadata of the HBase table, and the attribute value corresponding to the metadata, deleting, by the storage device, a data row corresponding to the attribute value from an index table corresponding to the table identifier and the metadata.

6. The data query method according to claim 1, wherein the method further comprises:
    sending, by the querier, a SparkSQL retrieval instruction to the connector;
    after the connector receives the SparkSQL retrieval instruction, generating, by the connector, a Phoenix retrieval instruction, and sending, by the connector, the Phoenix retrieval instruction to the storage device, wherein the Phoenix retrieval instruction contains a table identifier of an HBase table and metadata of the HBase table, or the Phoenix retrieval instruction contains a table identifier of an HBase table, metadata of the HBase table, and an attribute value corresponding to the metadata;

after the storage device receives the Phoenix retrieval instruction, if the Phoenix retrieval instruction contains the table identifier of the HBase table and the metadata of the HBase table, sending, by the storage device, an index table corresponding to the table identifier and the metadata to the connector; or, if the Phoenix retrieval instruction contains the table identifier of the HBase table, the metadata of the HBase table, and the attribute value corresponding to the metadata, obtaining, by the storage device, a data row corresponding to the attribute value from an index table corresponding to the table identifier and the metadata, and sending, by the storage device, the data row to the connector; and after the connector receives the index table or the data row, sending, by the connector, the index table or the data row to the querier.

7. The data query method according to claim 1, wherein the method further comprises:

sending, by the querier, a SparkSQL associated query instruction to the connector, wherein the SparkSQL associated query instruction contains a first table identifier of an HBase table and a second table identifier of an associated HBase table corresponding to the HBase table;

after the connector receives the SparkSQL associated query instruction, generating, by the connector, a first Phoenix associated query instruction, and sending, by the connector, the first Phoenix associated query instruction to the storage device, wherein the first Phoenix associated query instruction contains the second table identifier;

after the storage device receives the first Phoenix associated query instruction, obtaining, by the storage device, all first-type data rows from the associated HBase table corresponding to the second table identifier, and sending, by the storage device, all the first-type data rows to the connector, wherein each of the first-type data rows includes an attribute value corresponding to at least one piece of metadata; and performing, for each piece of metadata in each of the first-type data rows, the following operations:

if an index table corresponding to the first table identifier and the metadata exists in the storage device, generating, by the connector, a second Phoenix associated query instruction, and sending, by the connector, the second Phoenix associated query instruction to the storage device, wherein the second Phoenix associated query instruction contains the first table identifier, the metadata, and an attribute value corresponding to the metadata;

after the storage device receives the second Phoenix associated query instruction, obtaining, by the storage device, a RowKey corresponding to the attribute value from an index table corresponding to the first table identifier and the metadata, obtaining, by the storage device, a second-type data row corresponding to the RowKey from the HBase table corresponding to the first table identifier, and sending, by the storage device, the second-type data row to the connector; and sending, by the connector, the first-type data row and the second-type data row to the querier after the connector associates the first-type data row with the second-type data row.

8. A data query system, comprising:

a querier to send a SparkSQL query instruction to a connector, wherein the SparkSQL query instruction contains a table identifier of an HBase table, metadata of the HBase table, and an attribute value corresponding to the metadata;

the connector to, after receiving the SparkSQL query instruction, if an index table corresponding to the table identifier and the metadata exists in a storage device, generate a first Phoenix query instruction, and send the first Phoenix query instruction to the storage device, wherein the index table records a correspondence between an attribute value of metadata of an HBase table and a RowKey of the HBase table, and the first Phoenix query instruction contains the table identifier, the metadata, and the attribute value; and the storage device to, after receiving the first Phoenix query instruction, obtain a RowKey corresponding to the attribute value from the index table corresponding to the table identifier and the metadata, obtain a data row corresponding to the RowKey from the HBase table corresponding to the table identifier, and send the data row to the connector, wherein the connector sends the data row to the querier after receiving the data row.

9. The data query system according to claim 8, wherein the querier is further to send a SparkSQL creation instruction to the connector, wherein the SparkSQL creation instruction contains a table identifier of an HBase table and metadata of the HBase table;

the connector is further to, after receiving the SparkSQL creation instruction, generate a Phoenix creation instruction, and send the Phoenix creation instruction to the storage device, wherein the Phoenix creation instruction contains the table identifier and the metadata; and the storage device is further to, after receiving the Phoenix creation instruction, obtain an attribute value corresponding to the metadata and a RowKey corresponding to the attribute value from the HBase table corresponding to the table identifier, create an index table corresponding to the table identifier and the metadata, and record in the index table a correspondence between the attribute value and the RowKey.

10. The data query system according to claim 8, wherein the querier is further to send a SparkSQL storage instruction to the connector, wherein the SparkSQL storage instruction contains a table identifier of an HBase table, at least one piece of metadata of the HBase table, an attribute value corresponding to each piece of metadata, and a RowKey;

the connector is further to, after receiving the SparkSQL storage instruction, perform the following operations for each piece of metadata: if an index table corresponding to the table identifier and the metadata exists in the storage device, generating a first Phoenix storage instruction and sending the first Phoenix storage instruction to the storage device, wherein the first Phoenix storage instruction contains the table identifier, the metadata, an attribute value corresponding to the metadata, and a RowKey corresponding to the attribute value; and the storage device is further to, after receiving the first Phoenix storage instruction, record a correspondence between the attribute value and the RowKey in the index table corresponding to the table identifier and the metadata.

11. The data query system according to claim 10, wherein
the connector is further to, after receiving the SparkSQL storage instruction, generate a second Phoenix storage instruction, and send the second Phoenix storage instruction to the storage device, wherein the second Phoenix storage instruction contains the table identifier, the at least one piece of metadata, an attribute value corresponding to each piece of metadata, and the RowKey; and
the storage device is further to, after receiving the second Phoenix storage instruction, record a correspondence between the RowKey and the attribute value corresponding to each piece of metadata in the HBase table corresponding to the table identifier.

12. The data query system according to claim 8, wherein
the querier is further to send a SparkSQL deletion instruction to the connector;
the connector is further to, after receiving the SparkSQL deletion instruction, generate a Phoenix deletion instruction, and send the Phoenix deletion instruction to the storage device, wherein the Phoenix deletion instruction contains a table identifier of an HBase table and metadata of the HBase table, or the Phoenix deletion instruction contains a table identifier of an HBase table, metadata of the HBase table, and an attribute value corresponding to the metadata; and
the storage device is further to, after receiving the Phoenix deletion instruction, delete an index table corresponding to the table identifier and the metadata if the Phoenix deletion instruction contains the table identifier of the HBase table and the metadata of the HBase table; or delete a data row corresponding to the attribute value from an index table corresponding to the table identifier and the metadata if the Phoenix deletion instruction contains the table identifier of the HBase table, the metadata of the HBase table, and the attribute value corresponding to the metadata.

13. The data query system according to claim 8, wherein
the querier is further to send a SparkSQL retrieval instruction to the connector;
the connector is further to, after receiving the SparkSQL retrieval instruction, generate a Phoenix retrieval instruction, and send the Phoenix retrieval instruction to the storage device, wherein the Phoenix retrieval instruction contains a table identifier of an HBase table and metadata of the HBase table, or the Phoenix retrieval instruction contains a table identifier of an HBase table, metadata of the HBase table, and an attribute value corresponding to the metadata;
the storage device is further to, after receiving the Phoenix retrieval instruction, send an index table corresponding to the table identifier and the metadata to the connector if the Phoenix retrieval instruction contains the table identifier of the HBase table and the metadata of the HBase table; or obtain a data row corresponding to the attribute value from an index table corresponding to the table identifier and the metadata and send the data row to the connector if the Phoenix retrieval instruction contains the table identifier of the HBase table, the metadata of the HBase table, and the attribute value corresponding to the metadata; and
the connector is further to send the index table or the data row to the querier after receiving the index table or the data row.

14. The data query system according to claim 8, wherein
the querier is further to send a SparkSQL associated query instruction to the connector, wherein the SparkSQL associated query instruction contains a first table identifier of an HBase table and a second table identifier of an associated HBase table corresponding to the HBase table;
the connector is further to, after receiving the SparkSQL associated query instruction, generate a first Phoenix associated query instruction, and send the first Phoenix associated query instruction to the storage device, wherein the first Phoenix associated query instruction contains the second table identifier;
the storage device is further to, after receiving the first Phoenix associated query instruction, obtain all first-type data rows from the associated HBase table corresponding to the second table identifier, and send all the first-type data rows to the connector, wherein each of the first-type data rows includes an attribute value corresponding to at least one piece of metadata; and
for each piece of metadata in each of the first-type data rows,
if an index table corresponding to the first table identifier and the metadata exists in the storage device, the connector is further to generate a second Phoenix associated query instruction, and send the second Phoenix associated query instruction to the storage device, wherein the second Phoenix associated query instruction contains the first table identifier, the metadata, and an attribute value corresponding to the metadata;
the storage device is further to, after receiving the second Phoenix associated query instruction, obtain a RowKey corresponding to the attribute value from an index table corresponding to the first table identifier and the metadata, obtain a second-type data row corresponding to the RowKey from the HBase table corresponding to the first table identifier, and send the second-type data row to the connector; and
the connector is further to send the first-type data row and the second-type data row to the querier after the connector associates the first-type data row with the second-type data row.

15. A connector, comprising:
a processor; and
a machine readable storage medium storing machine executable instructions,
wherein, by reading and executing the machine executable instructions, the processor is caused to:
receive a SparkSQL query instruction sent from a querier, wherein the SparkSQL query instruction contains a table identifier of an HBase table, metadata of the HBase table, and an attribute value corresponding to the metadata;
generate, if an index table corresponding to the table identifier and the metadata exists in a storage device, a first Phoenix query instruction, and send the first Phoenix query instruction to the storage device, wherein the index table records a correspondence between an attribute value of metadata of an HBase table and a RowKey of the HBase table, and the first Phoenix query instruction contains the table identifier, the metadata, and the attribute value, and causes the storage device to obtain a RowKey corresponding to the attribute value from the index table corresponding to the table identifier and the metadata, obtain a data row corresponding to the RowKey from the HBase table corresponding to the table identifier, and send the data row to the connector; and
send the data row received to the querier.

16. The connector according to claim 15, wherein the machine executable instructions further cause the processor to:

receive a SparkSQL creation instruction sent from the querier, wherein the SparkSQL creation instruction contains a table identifier of an HBase table and metadata of the HBase table; and generate a Phoenix creation instruction and send the Phoenix creation instruction to the storage device, wherein the Phoenix creation instruction contains the table identifier and the metadata, and causes the storage device to obtain an attribute value corresponding to the metadata and a RowKey corresponding to the attribute value from the HBase table corresponding to the table identifier, create an index table corresponding to the table identifier and the metadata, and record in the index table a correspondence between the attribute value and the RowKey.

17. The connector according to claim 15, wherein the machine executable instructions further cause the processor to:

receive a SparkSQL storage instruction sent from the querier, wherein the SparkSQL storage instruction contains a table identifier of an HBase table, at least one piece of metadata of the HBase table, an attribute value corresponding to each piece of metadata, and a RowKey; and perform the following operations for each piece of metadata: if an index table corresponding to the table identifier and the metadata exists in the storage device, generating a first Phoenix storage instruction and sending the first Phoenix storage instruction to the storage device, wherein the first Phoenix storage instruction contains the table identifier, the metadata, an attribute value corresponding to the metadata, and a RowKey corresponding to the attribute value, and causes the storage device to record a correspondence between the attribute value and the RowKey in the index table corresponding to the table identifier and the metadata.

18. The connector according to claim 15, wherein the machine executable instructions further cause the processor to:

receive a SparkSQL deletion instruction sent by the querier; and generate a Phoenix deletion instruction and send the Phoenix deletion instruction to the storage device, wherein the Phoenix deletion instruction is either of an instruction which contains a table identifier of an HBase table and metadata of the HBase table, and which causes the storage device to delete an index table corresponding to the table identifier and the metadata, and an instruction which contains a table identifier of an HBase table, metadata of the HBase table, and an attribute value corresponding to the metadata, and which causes the storage device to delete a data row corresponding to the attribute value from an index table corresponding to the table identifier and the metadata.

19. The connector according to claim 15, wherein the machine executable instructions further cause the processor to:

receive a SparkSQL retrieval instruction sent from the querier;

generate a Phoenix retrieval instruction and send the Phoenix retrieval instruction to the storage device, wherein the Phoenix retrieval instruction is either of an instruction which contains a table identifier of an HBase table and metadata of the HBase table, and which causes the storage device to send an index table corresponding to the table identifier and the metadata to the connector, and an instruction which contains a table identifier of an HBase table, metadata of the HBase table, and an attribute value corresponding to the metadata, and which causes the storage device to obtain a data row corresponding to the attribute value from an index table corresponding to the table identifier and the metadata and send the data row to the connector; and send the index table or the data row to the querier after receiving the index table or the data row.

20. The connector according to claim 15, wherein the machine executable instructions further cause the processor to:

receive a SparkSQL associated query instruction sent from the querier, wherein the SparkSQL associated query instruction contains a first table identifier of an HBase table and a second table identifier of an associated HBase table corresponding to the HBase table;

generate a first Phoenix associated query instruction and send the first Phoenix associated query instruction to the storage device, wherein the first Phoenix associated query instruction contains the second table identifier, and causes the storage device to obtain all first-type data rows from the associated HBase table corresponding to the second table identifier and send all the first-type data rows to the connector, each of the first-type data rows including an attribute value corresponding to at least one piece of metadata; and perform the following operations for each piece of metadata in each of the first-type data rows:

if an index table corresponding to the first table identifier and the metadata exists in the storage device, generating a second Phoenix associated query instruction, and sending the second Phoenix associated query instruction to the storage device, wherein the second Phoenix associated query instruction contains the first table identifier, the metadata, and an attribute value corresponding to the metadata, and causes the storage device to obtain a RowKey corresponding to the attribute value from an index table corresponding to the first table identifier and the metadata, obtain a second-type data row corresponding to the RowKey from the HBase table corresponding to the first table identifier, and send the second-type data row to the connector; and send the first-type data row and the second-type data row to the querier after associating the first-type data row with the second-type data row.

* * * * *